Patented Feb. 16, 1937

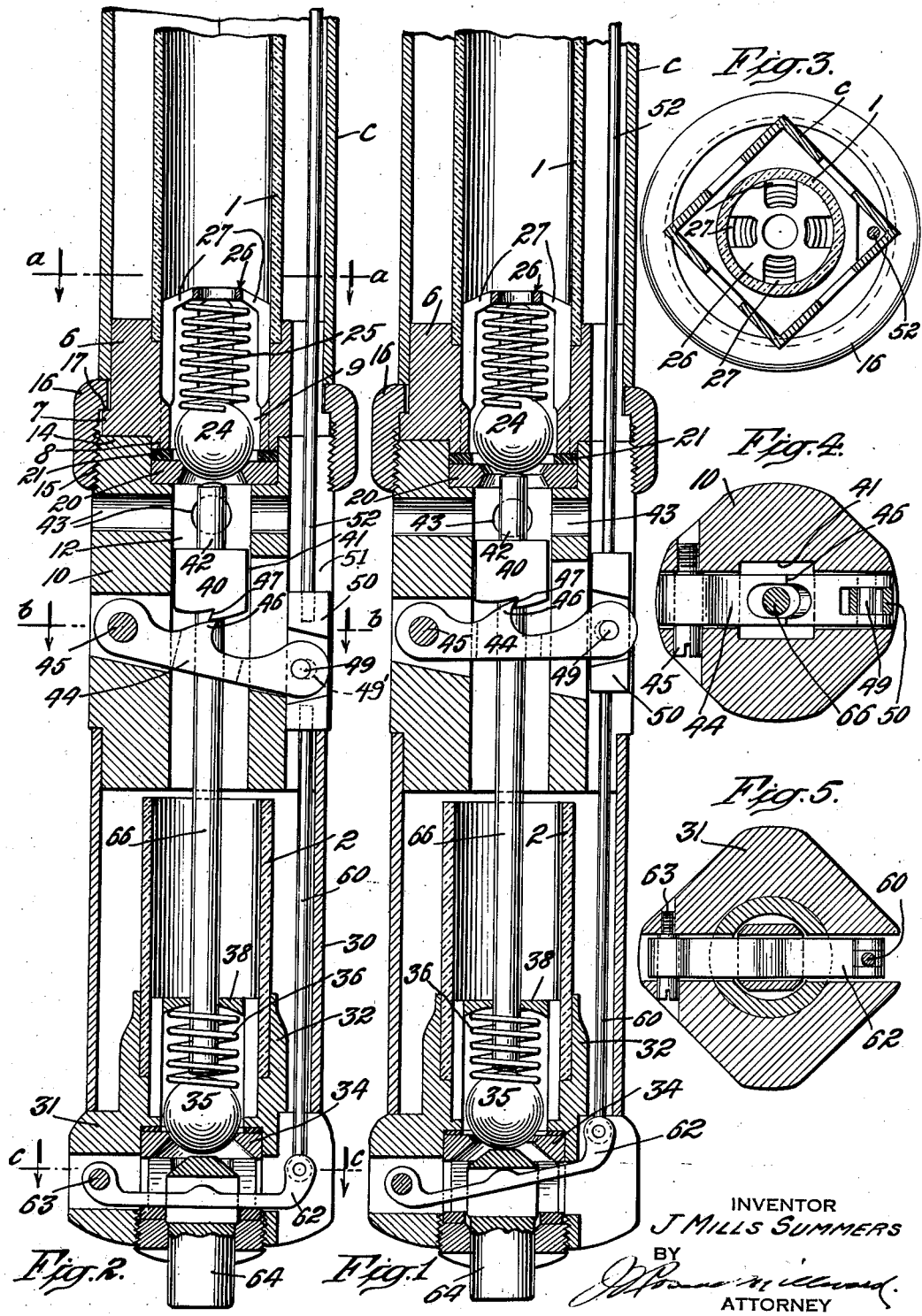

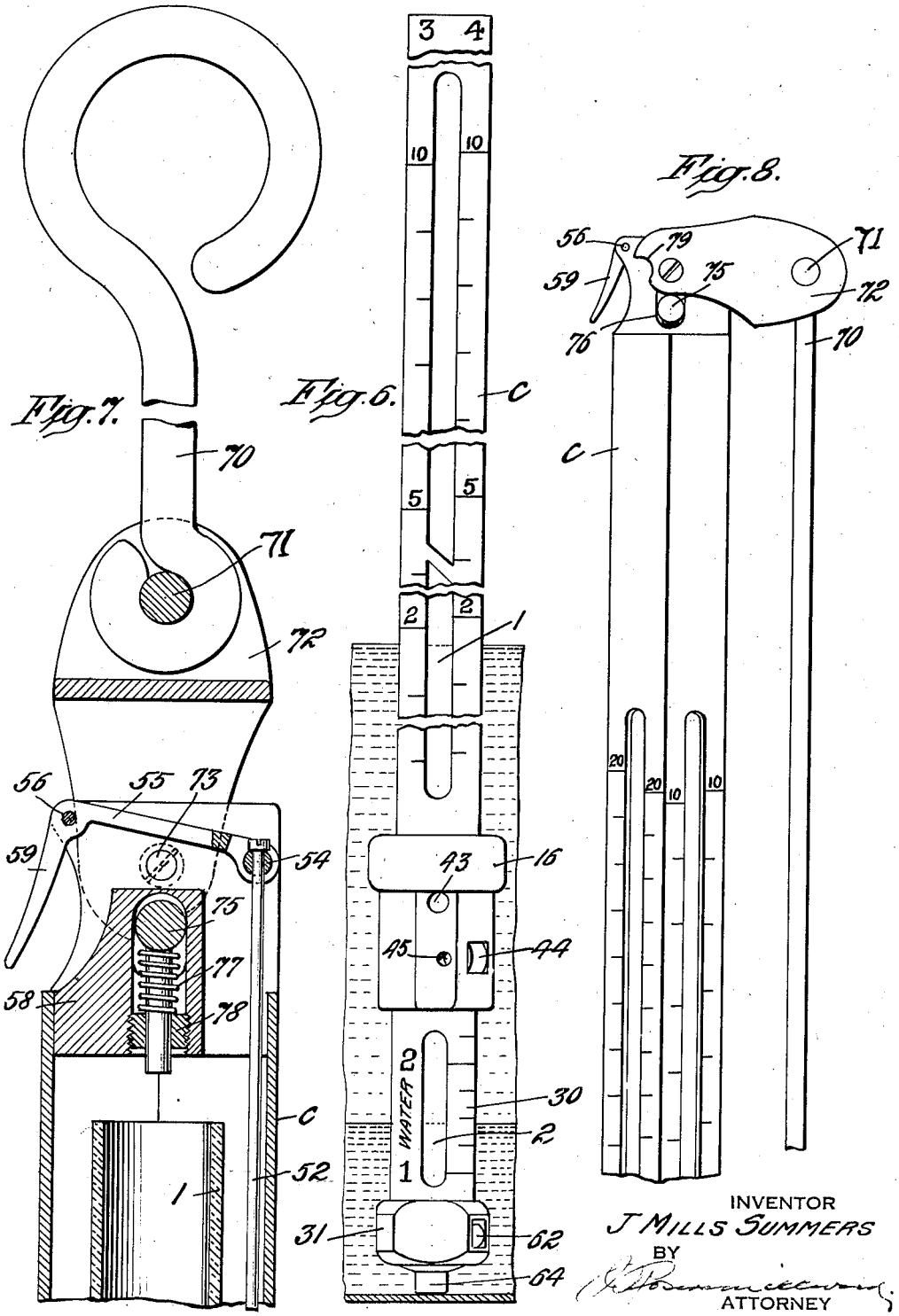

2,071,145

UNITED STATES PATENT OFFICE 2,071,145

LIQUID GAUGING DEVICE

J Mills Summers, Englewood, N. J.

Application October 17, 1935, Serial No. 45,489

6 Claims. (Cl. 73—120)

The present invention relates to liquid gauging devices for measuring the volume of liquid within a storage tank and is designed to produce an improved gauging device which offers substantial advantages over the devices as heretofore employed for the purpose. The improved gauge is adapted particularly for maintaining accurate inventories of gasoline tanks of automobile service stations and is designed to permit gauging both the gasoline and water content of the tanks with a greater degree of accuracy and more rapidly than has heretofore been possible under conditions of varied liquid content and more or less turbulence as a result of recharging of the tank. As a result, by the use of my improved gauge not only may prompt and accurate check of gasoline deliveries be made and with constant determination of the water content but in addition a further economical advantage is obtained incident to the allowable and very material saving in time in the initial calibrating of the gauge device with relation to the particular tanks to be measured therewith.

Important features of my improved gauge which contribute to the improved rapidity of the gauging operation consist in an improved multi-gauge arrangement employing separate gauge tube sections for gauging the lowermost or water zone of the tank and the upper or gasoline zone, each of which extends from the liquid to be gauged thereby into and is open to the liquid or fluid of next lighter specific gravity thereabove; an improved valve arrangement incorporated with each of the tube sections adapted to permit the gauge tubes to be introduced into the liquid with opened valve and with means for closing of the valves upon the device being fully inserted so as to entrap the liquid for gauge reading the release of the valves for closing being automatically effected by an engagement with the bottom of the tank. Also an improved valve operating mechanism connected to effect opening of each of the valves simultaneously for draining of the gauges after each reading and operative automatically to reset the valves in open position preparatory to the succeeding gauging operation.

The described and other important features and advantages of my improved device will be more fully understood by reference to the accompanying drawings wherein like reference characters are applied to the corresponding parts in the several views.

In the drawings:

Fig. 1 is a central, vertical, sectional view of the lower portion of a gauging device constructed to embody the features of my invention and showing the parts in the "open valve" position for insertion in the tank to be gauged.

Fig. 2 is a similar view showing the parts in position after releasing and closing of the valves to entrap the liquid for reading.

Fig. 3 is a cross-sectional view taken on line a—a of Fig. 2.

Fig. 4 is a cross-sectional view taken on line b—b of Fig. 2.

Fig. 5 is a cross-sectional view taken on line c—c of Fig. 2.

Fig. 6 is a view of my improved gauge in side elevation showing the method of calibrating for different tanks.

Fig. 7 is a central, vertical sectional view of the upper part of the gauge showing the operating lever or trigger release for the valve operating connections.

Fig. 8 is a view of the upper end portion of the gauge showing the extension rod or handle member in folded position relative to the casing.

In the approved embodiment of the features of my invention as here illustrated, the gauge device is composed of upper and lower transparent gauge tubes 1 and 2 which are supported in vertical alignment within a protective casing c desirably formed of metal of hollow square cross-section or squared tubing having its side walls longitudinally slotted for observation of the gauge tubes; the latter being of glass or pyroxylin composition as may be desired. In the structure as shown the upper and lower gauge tubes are connected by a two part connector member consisting of an upper tube sealing member 6 within which the upper gauge tube is secured and sealed by a tight fit. The member 6 is formed with an external annular shoulder flange 7 and at its underside with an annular sealing flange 8 and has a central bore 9. A lower connector bearing member 10, complemental thereto, is provided with a central bore 12 therethrough having an upper enlargement providing an upper annular flange portion 14 seating in the lower portion of the member 6, the flange portion being externally threaded at 15 for engagement with internally threaded clamping collar 16 having internal flange 17 bearing upon flange 7 for detachably securing parts 6 and 10 of the connector. Interposed between the members 6 and 10 a hardened steel valve seat 20 is positioned within the bore enlargement of member 10 with an annular fiber sealing washer 21 compressed between the seat 20 and the member 6. The valve seat member 20 has a central annular bore formed with a seat for a ball valve 24 normally closed by a spring 25 compressed between the ball and a retaining cage member 26 secured to the member 6; the cage 26 having side openings 27 for passage of the liquid into the tube 1. The upper end of the tube 1 is open as shown for the escape of air displaced by the liquid in the gauging operation.

The lower or water gauge 2 is supported by a supplementary protective casing 30 having longitudinal slots for reading of the gauge. The casing is connected at its upper end to connector member 10 and supports at its lower end a sealing and bearing member 31 having an upper annular portion 32 within which the tube 2 is fitted with a close sealing fit. The upper end of the tube is open. The member 31 supports a valve seat 34 engaged by a valve ball 35 normally closed by spring 36 bearing at its upper end against open sided retaining cage member 38.

In accordance with my invention and to obtain the desired degree of accuracy in operation, the gauges are introduced into the liquid to be measured with the valves in open position to permit free entry of the liquid into the tubes as the device is lowered therein. For this purpose, means are provided for manually opening the valves and for retaining the valves in open position together with provision for releasing the retaining means when the device is fully inserted within the tank whereby proper gauging is assured by a simplified and positive operation. This mechanism as related to the uppermost valve 24 consists of a valve lifter slide and latch element 40 having a squared body portion vertically slidable within a similarly formed vertical slideway or bore 41 in the member 10 and having a reduced section or lifter pin 42 thereon positioned centrally beneath the ball whereby upon being elevated it will lift the ball to allow passage of the liquid within the tube 1; radial openings or entry ports 43 being provided to admit the liquid beneath the valve as shown.

For raising of the lifter slide 40, a latch lever 44 is pivoted at 45 within a suitable transverse opening in the member 10. This lever is formed on its upper face with a detent 46 positioned to engage a co-acting detent 47 formed on the underside of the slide 40 when the latter is raised into the open valve position of Fig. 1. For operating the lever 44 it is connected at its outer end by pin 49, fitting a slot 49' therein, to a slide block 50 operating in a vertical guide slot 51 formed in member 10. A rod 52 connected to block 50 is extended upwardly within the casing c to the upper end of the gauge where, as shown in Fig. 7, it is pivotally connected at 54 to a trigger lever 55 pivoted by pin 56 carried by opposite ears of a cap member 58 secured on the upper end of the casing. The lever 55 has a projecting trigger 59 which when pressed inwardly effects lifting of the valve 24 as will be readily understood.

The operating connections described likewise effect the opening of the water gauge valve 35 by means of extension rod 60 connecting the lower end of the block 50 to a lever 62 pivoted at 63 in the member 31. The lever 62 is passed through a slot in a plunger or movable pin 64 vertically slidable in and downwardly projecting from the member 31 and is engaged by the lever in its upward movement to effect lifting of the ball as shown in Fig. 1 against the influence of the spring 36. Accordingly, inward pressure on the trigger 59 will transmit opening movement to each of the valves 24 and 35 and upon the engagement of the detents 46 and 47 the valves 24 and 35 will be retained in their elevated position until released by a further lifting of the latch member 40 sufficient to release detent 46 and thereby allow depression of the lifting levers 44 and 62 by the weight of the parts. Provision for this further and releasing movement of the latch 40 is made by the arrangement of a central rod or pin 66 connected to slide 40, having a slide bearing in cage 38 and having rest bearing upon the lower ball 35. As a result, raising of the plunger 64, allowed by the depth of the cross-slot therein, will transmit increment lifting movement to the valves from that of the open position as shown in Fig. 1 thereby releasing the retaining engagement of the detents. This occurs upon depressing the device against the bottom of the tank whereby upon subsequent lifting thereof the valves will automatically close to entrap and seal the liquid within the tubes.

The gauge proper is of a height proportionate to the depth or diameter of the tanks to be measured therewith and its upper end is desirably provided with an extension handle which is supported to be foldable for convenience in transporting and stowing of the device. To this end, a handle extension 70 is connected pivotally by pin 71 on a yoke or foldable bracket 72 pivoted by pin 73 on cap member 58 to be foldable from the vertically aligned position of Fig. 7 to a folded position of Fig. 8. It is normally and yieldingly held in vertical position by means of a spring pressed retained pin 75 operating in a vertically elongated slot 76 in member 58 wherein it is upwardly pressed by spring 77 confined in a socket by screw plug 78. The opposite, projecting ends of the pin 75 are engaged by retaining notches 79 in the bracket 72, the notches at one side being formed with a wall of reduced depth to exert a camming action on the pin to be pressure yielding to permit the folding to one side, as shown in Fig. 8 in the opposite direction to the position of the trigger 59. As shown in Figs. 6 and 8, the outer surface of the casing is provided at each side of the longitudinal openings with graduation marking calibrated with relation to specific tanks as customarily practised.

In the use of my improved gauging device, as will be understood from the foregoing, the trigger 59 will be pressed inwardly preparatory to use thereby effecting the opening of both the upper and lower valves which will then be retained in opened position by means of the engaging detents 46—47. The gauge is then inserted within the tank to be measured as to contents, to the bottom thereof and upon applying a slight downward pressure thereon the plunger 64 will be moved upwardly within the member 31 to engage and further lift the ball 35 and through the rod 66 likewise the latch 40 thereby to release the detent engagement and valve lifting connections which latter will drop by their own weight. Upon then lifting the gauge device for withdrawal the valves will automatically close to entrap the liquid within each of the gauge tubes. Subsequent emptying will reset the device for further use.

The improved arrangement of separate gauging means for the measuring of the volume of liquids of different specific gravity, and under conditions of varied total depths as herein provided for, affords a simple and expeditious method of determining the volume content of the tanks with a degree of accuracy not heretofore readily obtained. Important factors which contribute to my improved and more accurate gauge are the separate gauging of the liquids of differing specific gravity in the single operation, the insertion of the gauging device into the liquid with the valves open to allow free entry of the liquid as the device is lowered and the automatic closing of the valves at the interval of withdrawal for reading.

In addition to the structural and operating advantages tending to facility and convenience in the gauging operation, the improved device eliminates the inaccuracies of the type of gauging devices which are inserted with closed valves and opened when fully submerged resulting in surging of the liquid into the gauge tube under full pressure and momentum with further excess entrapping of the heavier liquid when present. The improved gauge further allows of accurate gauging under more or less turbulent conditions of the liquid as may exist immediately after refilling of the tank and accordingly permits checking up without undue delay and likewise permits accurate calibration of the gauge device to a given tank without the substantial time loss incident to awaiting quiescent conditions after each measured filling required in that operation.

While I have shown and described an approved embodiment of the features of my invention, it will be understood that varied modifications may be made therein without departing from the scope of the invention as defined in the appended claims.

Having described my invention, I claim:

1. A gauge device of the character described embodying a transparent tube with valves at different levels, means for retaining the valves open while inserting the gauge into the liquids and means for automatically releasing the valves, preparatory to closing, upon contact with the bottom of the tank and further means operative automatically to close the valves upon lifting the gauge from contact with the bottom of the tank.

2. A gauge device of the character described consisting of a casing member, a connector secured to the lower end thereof and having a central passage therethrough, a gauge tube connected to be sealed by the connector, a valve seat carried by the connector in said passage, a valve ball co-acting with the seat, a spring acting normally to close the valve, a lifter vertically movable in the connector and provided with a pin extension to engage the ball, said lifter being formed on its underside with a detent, a latch lever pivoted on the connector beneath the lifter and having a co-acting detent, connections to the latch lever for manually elevating the same to open the valve and to effect engagement of the detents and means adapted by engagement with the bottom of the tank to elevate the lifter to release the detent engagement.

3. A gauge device of the character described consisting of an upper casing member, a connector secured to the lower end thereof and having a central passage therethrough, a gauge tube sealed in the connector, a valve seat carried by the connector in said passage, a valve ball co-acting with the seat, a spring acting normally to close the valve, a lifter slide vertically slidable in the connector beneath the ball and provided with a pin extension adapted to engage the ball, said slide being formed on its underside with a detent, a latch lever pivoted on the connector beneath the lifter slide and having a co-acting detent, connections to the latch lever for manually operating the same to open the valve and to effect engagement of the detents, a lower casing member secured to the underside of the connector, a bearing member secured at the lower end thereof and having a central passage, a lower gauge tube sealed in said bearing member, a valve seat secured in said passage, a ball valve positioned to engage said seat, a spring normally closing said valve, a plunger pin vertically slidable in the bearing member beneath the ball and adapted to engage the ball for lifting it to open position, a pivoted lever in said bearing member engaging the plunger pin, connections from said lever to the manually operated connections whereby the valves are opened in unison and a motion transmitting rod bearing on the lower valve ball and connected to the lifter slide whereby elevation of the plunger pin will elevate the lifter slide to release the detent engagement.

4. A gauge device of the character described adapted for measuring the liquid content of tanks consisting of supporting means, separate transparent gauge tubes carried thereby, valve means associated with each of the tubes and operative normally to seal the liquid within the tubes for gauging thereof, connections for manually opening the valve means, retaining means operative to retain the valves in open position and means for releasing the retaining means operative by engagement with the bottom of the tank and means automatically to effect the closing of the valves upon lifting of the gauge.

5. A gauge device of the character described adapted for measuring the liquid content of tanks consisting of a supporting member, separate gauge tubes carried thereby, valve means associated with each of the tubes and operative normally to seal the liquid within the tubes for gauging thereof, interactive connections for manually opening the valve means, latching means operative to retain the valves in open position, a plunger element positioned at the bottom of the gauge device and adapted to elevate the lower valve upon engagement of the plunger with the bottom of the tank and connections from the lower to the upper valve means whereby the movement of the plunger will be transmitted to release the latching means to permit automatic closing of the valves upon elevation of the device.

6. A gauge device of the character described embodying a transparent tube with a valve for trapping liquid of varying total content and differing specific gravity as they are related in the same tank, means for retaining the valve open while inserting the gauge into the liquid and means for automatically releasing the valve retaining means, preparatory to closing, upon contact with the bottom of the tank and further means operative automatically to close the valve upon lifting the gauge from contact with the bottom of the tank.

J MILLS SUMMERS.